United States Patent [19]
Nabetani et al.

[11] 3,862,441
[45] Jan. 21, 1975

[54] MOS-FET TIMING CIRCUIT

[75] Inventors: Hiroshi Nabetani; Atsushi Ueda; Kousaku Uota; Mitsuaki Ishii, all of Himeki, Japan

[73] Assignee: Mitsubishi Denki Kabushiki Kaisha, Tokyo, Japan

[22] Filed: Nov. 21, 1973

[21] Appl. No.: 417,923

[30] Foreign Application Priority Data
Nov. 22, 1972 Japan.............................. 47-117371
Dec. 5, 1972 Japan.............................. 47-121781

[52] U.S. Cl................. 307/293, 307/273, 307/279, 307/297, 307/304
[51] Int. Cl. .......................................... H03k 17/26
[58] Field of Search .......... 307/293, 297, 304, 273, 307/279

[56] References Cited
UNITED STATES PATENTS
3,578,989  5/1971  Heuner ............................ 307/273
3,621,297  11/1971 Dean................................ 307/293
3,657,568  4/1972  Dargent............................ 307/304
3,657,575  4/1972  Taniguchi ......................... 307/297
3,721,832  3/1973  Lee................................... 307/293
3,721,833  3/1973  Kramer.............................. 307/293

*Primary Examiner*—Stanley D. Miller, Jr.
*Attorney, Agent, or Firm*—Oblon, Fisher, Spivak, McClelland & Maier

[57] ABSTRACT

A timing circuit for accurately measuring a certain time interval after an engine stops. The circuit comprises a compensation-type MOS-FET device which includes an n-channel MOS-FET and a p-channel MOS-FET with common drain and gate connections as the output and inputs to the device. The circuit further includes a condenser and resistor connected to the input of the compensation MOS-FET device. The ratio of the mutual conductance of the n-channel MOS-FET to the mutual conductance of the p-channel MOS-FET is selected to be greater than 10 or less than 0.1, whereby the timing output may be accurately determined by the time constant of the resistor and condenser.

3 Claims, 6 Drawing Figures

MOS-FET TIMING CIRCUIT

BACKGROUND OF THE INVENTION

1. Field of the Invention

This invention relates to a timing circuit and, more particularly, to a circuit for measuring a specific time after the stopping of an engine of a vehicle.

2. Description of the Prior Art

In general, a timing circuit is formed by utilizing the charge and discharge system of a condenser. The bias current fed to the detecting unit imparts serious disadvantages to timing accuracy which is fatal to such a timing circuit. When a timing circuit having a relatively long period (longer than 1 minute) is formed by utilizing the discharge of a condenser, it is desirable to detect the voltage applied to both ends of the condenser by the small bias current. It is preferable to have an accurate and simple circuit structure for a timing circuit under long term operation with a very small bias current.

Various engine interlock apparatus are known for preventing the starting of an engine when a seat belt used as a safety apparatus is not fastened under normal conditions. It is necessary to cease the functioning of such an interlock for a specific time when the engine is stopped after starting. When an engine is driven automatically, an alarm is required for a specific time after the engine stops.

SUMMARY OF THE INVENTION

It is therefore an object of this invention to provide a simple and economical timing circuit for accurately measuring a time after an engine stops when the engine is stopped after the starting thereof.

The foregoing and other objects are attained in accordance with one aspect of the present invention through the provision of a timing circuit comprising a compensation-type MOS-FET field effect transistor having a condenser and a resistor at an input point, wherein the ratio of the mutual conductance of an n-channel MOS-FET to the mutual conductance of a p-channel MOS-FET is higher than 10 or lower than 0.1 whereby the timing output at the output point of said compensation-type MOS-FET is determined by the time constant of the resistor and condenser.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENTS

Figure 1:
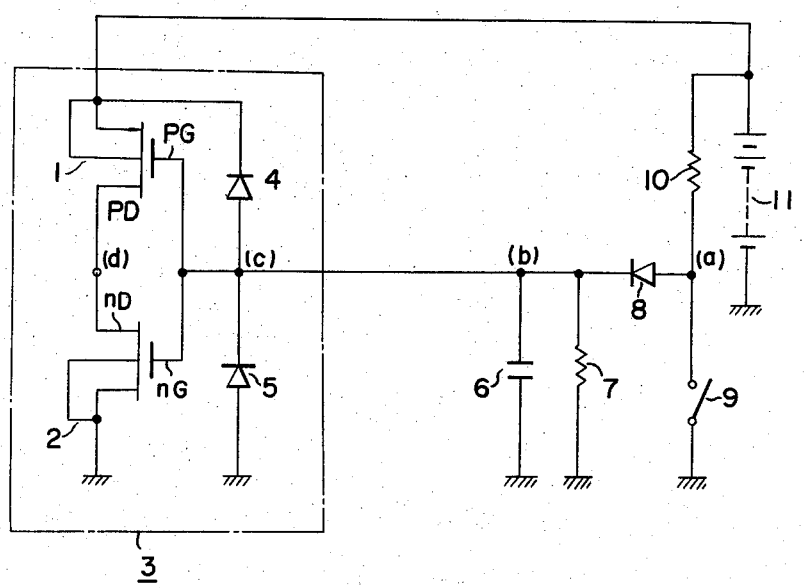
FIG. 1 is an electric circuit diagram of one preferred embodiment of the present invention.

Referring now to the drawings, wherein like reference numerals designate identical or corresponding parts throughout the several views, and more particularly to FIG. 1 thereof, a preferred embodiment of a timing circuit of the present invention is seen to comprise a p-channel MOS-FET 1 (hereinafter referred to as a p-MOS), an n-channel MOS-FET 2 (hereinafter referred to as an n-MOS), a compensation-type MOS-FET 3 (hereinafter referred to as a c-MOS), diodes 4, 5 and 8, a condenser 6, resistors 7 and 10, an oil pressure switch 9 and a power source 11.

The general characteristics of c-MOS 3 will now be explained. In c-MOS 3, the gate structure is formed by a metal-insulating material-semiconductor. The input impedance is in the range of from $10^{12}$ to $10^{14}$ ohms and the c-MOS is operated by an input voltage without an input bias current. Such features are the same as those of conventional MOS-FETS, however, the input-output characteristics of the present invention are advantageous. In FIG. 1, the reference c designates an input point of c-MOS 3, and d designates an output point of c-MOS 3. The input point c is a point connecting the gate PG of p-MOS 1 with the gate nG of n-MOS 2; and the output point d is a point connecting the drain PD of p-MOS 1 with the drain nD of n-MOS 2. The source of p-MOS is connected to the power source 11 and the source of n-MOS 2 is connected to ground.

Figure 2:
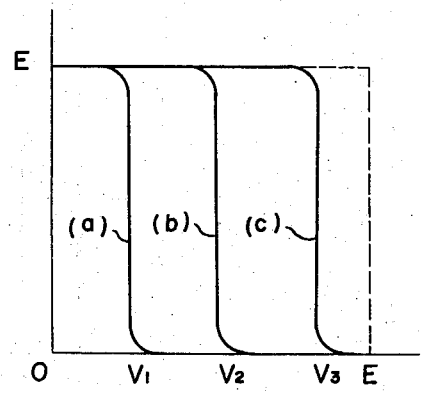
FIGS. 2 and 3 are characteristic charts depicting the operation of the compensation type MOS-FET of FIG. 1.

FIG. 2 shows the input and output characteristics of c-MOS 3 wherein characteristic curves a, b and c represent the ratio of the mutual conductance (hereinafter referred to as gm) of p-MOS 1 to n-MOS 2. The characteristic curve b represents where the ratio of the gm of p-MOS 1 to n-MOS 2 is 1 and the threshold voltage of $V_2$ is the same as E/2, wherein E represents the voltage of the power source 11. On the contrary, when the gm of p-MOS 1 is lower than the gm of n-MOS 2, the threshold potential $V_1$ is less than $V_2$ as shown in curve a of FIG. 2. When the gm of n-MOS 2 is lower than the gm of p-MOS 1, the threshold potential $V_3$ is higher than $V_2$ as shown in curve c of FIG. 2. That is, the threshold potential of c-MOS 3 is determined by the ratio of the gm of p-MOS 1 to n-MOS 2.

Figure 3:
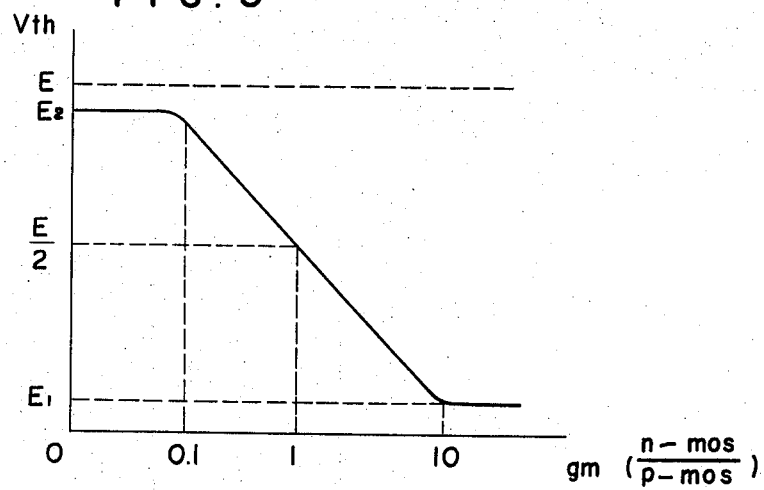

FIG. 3 shows variations in the threshold potential Vth to the ratio of the gm of p-MOS 1 to n-MOS 2 in c-MOS 3. As is clear from FIG. 3, when the ratio of the gm is 1, the threshold potential Vth is one-half of the power source voltage E. When the gm of p-MOS 1 is lower than the gm of n-MOS 2, the threshold potential Vth is less than E/2. When the ratio of the gm is higher than 10, a substantially constant threshold potential $E_1$ is provided. On the contrary, when the ratio of the gm is lower than 0.1, a constant threshold potential $E_2$ which is substantially the same as the power voltage E is provided.

The present invention is directed towards providing a timing circuit with a long set time, and thus it is preferable that the threshold potential Vth of c-MOS 3 be $E_1$ or $E_2$. Accordingly, in the invention, the ratio of the gm of n-MOS 2 to p-MOS 1 is higher than 10 or lower than 0.1. Incidentally, diodes 4 and 5 are provided to prevent breakdown of the reverse gate voltage of c-MOS 3.

Referring again to FIG. 1, the operation of the first preferred embodiment having the above-recited characteristics of c-MOS 3 will now be explained. At the time an engine of a vehicle is stopped the oil pressure switch 9 is closed whereby point a is at ground potential and the charge on condenser 6 is zero. When the threshold potential of c-MOS 3 is Vth, the output d is the power voltage E. When the engine of the vehicle is started, the oil pressure switch 9 will be turned off. Accordingly, the condenser 6 will be charged through the resistor 10 and the diode 8 by the power source 11. If the resistance of the resistor 7 is much higher than the resistance of the resistor 10, the condenser 6 will be charged to substantially the same voltage as the power voltage E. As long as E > Vth, the output d of c-MOS 3 will be substantially at ground potential. The output can be, for example, a signal for stopping the functioning of the engine interlock apparatus (not shown in the drawing). As the engine stops the oil pressure switch 9 is turned on again (closed) and point a will be at ground potential; however, the condenser 6 maintains its charge of the power source voltage E. Accordingly, a reverse bias will be applied to the diode 8 so that it will be in its cut off condition. The charge of the condenser 6 is then discharged through the resistor 7 and the input resistor of c-MOS 3, whereby the potential at the point b will decrease. Since the input resistance of c-MOS 3 is quite high, as stated above, in comparison with the resistor 7, the input resistance of c-MOS 3 can be neglected. Accordingly, the discharge time constant T of the condenser 6 can be determined by the capacity C of the condenser 6 and the resistance R of the resistor 7, as follows:

$$T = 0.6\, C\, R.$$

In order to provide a long term, the resistance R of the resistor 7 can sometimes be higher than $10^6$ ohms. When the potential at point b is lower than the threshold potential Vth of c-MOS 3, the output d can be the power voltage E. The time $T_o$ that it takes for the voltage at point b to build up to the threshold voltage Vth after the engine stops is the set time. The function of the engine interlock apparatus is stopped following the operation of the engine during the time after the engine stops. From the above relation, when the power source voltage is constant, the set time can be determined by the resistor 7, the condenser 6 and the threshold voltage Vth of c-MOS 3. Accordingly, in order to provide a relatively long time in said embodiment, the threshold voltage Vth can be decreased relative to the power source voltage E, and the resistance of resistor 7 and the capacity of condenser 6 can be increased. Vth is preferably set to $E_1$ as seen in FIG. 3.

According to an experiment conducted to verify the foregoing, when E = 12V, Vth = 1.5 V, R = 10 MΩ, and C = 6.8 μF, a set time of 2 minutes and 30 seconds is accurately and easily provided. In order to prevent fluctuation of the power source voltage E, a Zener diode (not shown in the drawing) can be connected in parallel to the oil pressure switch 9. In such an operation, both p-MOS 1 and n-MOS 2 will not simultaneously conduct, whereby the power consumption of the power source 11 can be small. c-MOS 3 has a threshold voltage having the same polarity as the power source 11, so that the circuit structure can be simplified.

Figure 4:
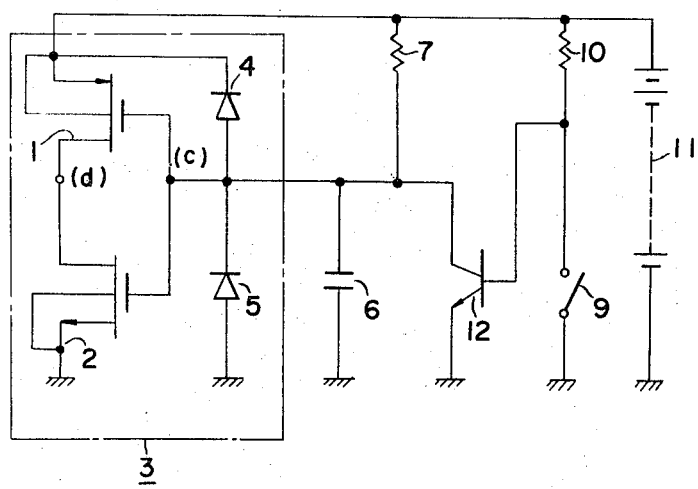
FIG. 4 is an electric circuit diagram of another preferred embodiment of the present invention.

FIG. 4 is an electric diagram of a second preferred embodiment of the present invention wherein the reference numeral 12 designates a transistor. In this embodiment, the gm of n-MOS 2 is lower than the gm of p-MOS 1 and the ratio of the gm is set to be lower than 0.1. The threshold voltage Vth is preferably $E_2$, as seen graphically in FIG. 3. In operation, when the engine stops the oil pressure switch 9 is turned on, whereby the transistor 12 is rendered non-conductive, and the condenser 6 is charged to the power source voltage E through the resistor 7. Accordingly, the power source voltage E is applied at point c of the gate of c-MOS 3. The output point d is at ground potential when $E > E_2$. The ground potential of the output point d provides a signal for operating the engine interlock apparatus in normal conditions. When the engine is started, the oil pressure switch 9 is turned off and the transistor 12 is rendered conductive. The charge of the condenser 6 will be discharged through the transistor 12, the gate input c of c-MOS 3 will be at ground potential, and at the output point d, the power source voltage E will be applied. When the engine stops, the oil pressure switch 9 is turned on again whereby the transistor 12 is rendered non-conductive. For a moment, the charge will travel through the resistor 7 to the condenser 6; however, the output d maintains the power source voltage E until the potential of the input point c is equal to the threshold voltage Vth of c-MOS 3. Accordingly, the functioning of the engine interlock apparatus will be stopped during the time that the potential of the input c increases to the threshold potential Vth after the engine stops.

In order to prolong the time to several minutes, it is preferable to have a high threshold potential Vth, such as $E_2$ in FIG. 3. When the threshold potential Vth is set to be $E_2$, the set time is determined by the resistor 7 and the condenser 6. As stated above, the invention provides a timing circuit having a long set time by having a ratio of the gm of n-MOS 2 to the gm of p-MOS 1 is c-MOS 3 of higher than 10 or lower than 0.1.

When c-MOS 3 is assembled in an integrated circuit, the set time can simply be given by the condenser 6 or the resistor 7 connected externally to the intergrated circuit. As usual, a high current passes through p-MOS 1 and n-MOS 2 by a preliminary gate voltage in c-MOS 3. However, either the gm of p-MOS 1 or the gm of n-MOS 2 can be decreased, and thus the current can be decreased so that the timing circuit having a long set time can have a small consumption power. Even though the timing circuit is connected to a battery in normal operation, either p-MOS 1 or n-MOS 2 will not be conductive in a static condition, whereby the battery consumption will be advantageously quite small.

Figure 5:
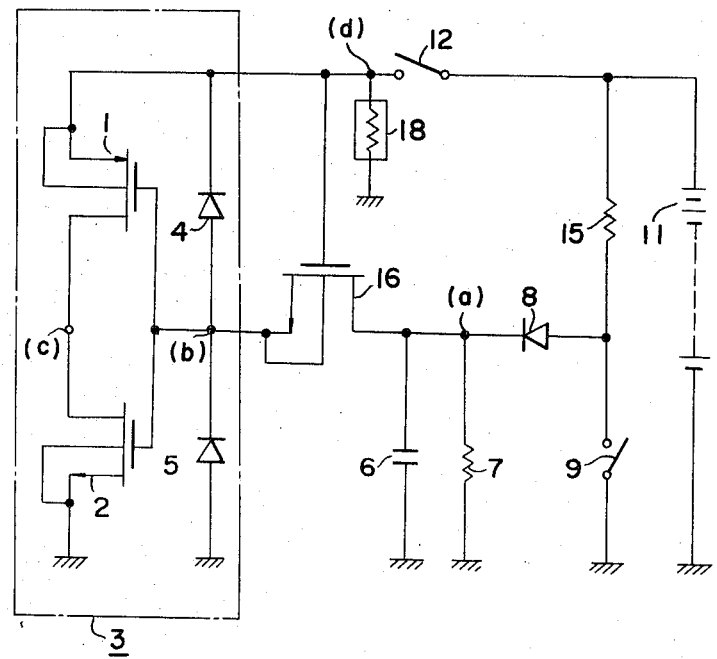
FIG. 5 is an electric circuit diagram of still another preferred embodiment of the present invention.

A third preferred embodiment of the present invention is shown in FIG. 5, wherein the reference numeral 1 designates a p-channel MOS-FET, 2 designates an n-channel MOS-FET, 3 designates a compensation-type MOS-FET consisting of p-MOS 1 and n-MOS 2, 4, 5 and 8 designates diodes, 16 designates an n-channel MOS-FET (hereinafter referred to as an n-MOS), 6 designates a condenser, 18 designates an electrical load equipped in the vehicle, 7 and 15 designate resistors, 12 designates an engine ignition key switch 9 designates an oil pressure switch of the engine, and 11 designates a power source.

Figure 6:
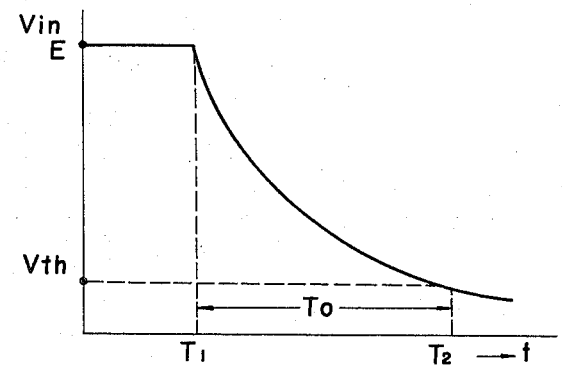
FIG. 6 is a characteristic chart for illustrating the operation of the electric circuit shown in FIG. 5.

Similar to the above-described embodiment, the oil pressure switch 9 is turned on when the engine of the vehicle stops, whereby the charge of the condenser 6 is zero. If the key switch 12 is turned on, n-MOS 16 is rendered conductive. When the input b of c-MOS 3 is at zero potential and the threshold potential Vth is $V_1$ as seen in FIG. 6, the output at c is the power source voltage E.

When the engine is started and the oil pressure switch 9 is turned off, the condenser 6 is charged in the closed circuit consisting of the power source 11, the resistance 15, the diode 8, the condenser 6, and the power source 11. The resistor 7 is selected to have a much higher resistance than that of the resistor 15, and accordingly, the point a will be at potential substantially the same as the power source voltage E. The time required for point a to attain the power source voltage E is quite short because of the low resistance of the resistor 15. At that time, the key switch 12 is turned on, n-MOS 16 is rendered conductive, the input b of c-MOS 3 is at the power source voltage E which is substantially same as the potential at the point a, and the output c is at ground potential.

The output c at ground potential can be a signal for stopping the functioning of the engine interlock apparatus (not shown in the drawing). The engine is stopped at the time $T_1$ seen in FIG. 6, and the oil pressure switch 9 is turned on whereby a reverse bias is applied to the diode 8 and the potential at the point a drops as shown in FIG. 6. The discharge time constant of the condenser 6 is determined by the capacity C of the condenser 6 and the resistance R of the resistor 7.

When the potential at point a is at the threshold potential Vth of c-MOS 3, the output c will be at the power source voltage E. When the time is Ti, $T_o = T_2 - T_1$ will be the set time of the timing circuit. The functioning of the engine interlock apparatus will be stopped during that time, whereby the engine can be started without connecting the seat belt.

In such a case, the key switch 12 is turned on, the power source voltage E having been applied previously to c-MOS 3, which is conductive. When the key switch 12 is turned off during the time $T_o$, that is the key switch 12 is turned off once after the engine stops, the following operation is performed. When the point a is directly connected to the point b without n-MOS 16, the charge of the condenser 6 will be discharged through the diode 4 for the protection of the gate of c-MOS 3 to the electric load 18 by turning off the key switch 12 whereby the time $T_o$ will be shortened. The electric load 18 shows various load resistances connected to the power source 11 of the vehicle. The resistance is usually low and accordingly, even though the time $T_o$ is several minutes long when the key switch 12 is repeatedly turned on, the time $T_o$ can decrease to several seconds when the key switch 12 is turned off once.

In order to prevent such trouble, n-MOS 16 is connected between the point a and the point b. In such a case, n-MOS 16 is set to turn on or off according to the potential at the point d. When the key switch 12 is turned on, the potential at the point d is the power source voltage E and n-MOS 16 will be turned on. When the key switch 12 is turned off, the potential at the point d is ground potential, and n-MOS 16 will be turned off. Accordingly, the charge of the condenser 6 will be discharged only through the resistor 7 when the key switch 12 is turned off, whereby the time $T_o$ is constant without being affected by the turning on and off of the key switch.

As stated above, in accordance with the invention, the voltage variation of the time constant circuit consisting of the resistor and the condenser is detected by a compensation type MOS-FET so as to obtain a desirable timing output. The compensation type MOS-FET can detect the voltage output of the time constant circuit by a very small bias current, and accordingly, a long timing output can be quite accurately obtained. Moreover, the operation level can easily be changed by selecting the mutual conductance of the compensation type MOS-FET. In the above third embodiment, a MOS-FET, which is controlled depending upon the turning on and off of the power source switch, is connected between the time constant circuit and the compensation type MOS-FET. Accordingly, a desirable timing output can be accurately obtained without being affected by the switching of the power source switch.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A timing circuit, which comprises:
   a d.c. power source;
   a compensation-type MOS-FET comprising a p-channel MOS-FET and an n-channel MOS-FET having interconnecting gates and drains as the input and output points thereof, the source of said p-channel MOS-FET connected to said d.c. power source;
   a resistor and a condenser each connected in parallel with said input point of said compensation-type MOS-FET;
   a second n-channel MOS-FET whose gate is connected to said d.c. power source, whose drain is connected to said resistor and capacitor, and whose source is connected to said input point of said compensation-type MOS-FET; and
   wherein the ratio of the mutual conductance of said n-channel MOS-FET to the mutual conductance of said p-channel MOS-FET is higher than 10 or lower than 0.1.

2. A timing circuit comprising
   a compensation-type MOS-FET having an input and an output,
   said compensation-type MOS-FET further including a p-channel MOS-FET having a source, a drain and a gate,
   said compensation-type MOS-FET further including an n-channel MOS-FET having a source, a drain and a gate,
   a capacitor,
   a resistor,
   a diode,
   a switch,
   means connecting the drain of said p-channel MOS-FET and the drain of said n-channel MOS-FET to said output point,
   means connecting the gate of said p-channel MOS-FET and the gate of said n-channel MOS-FET to said input point,
   means connecting the source of said p-channel MOS-FET to a power source,
   means connecting the source of said n-channel MOS-FET to ground,
   means connecting said capacitor between said input point and ground, means connecting said resistor between said input point and ground, means connecting said diode between said resistor and said switch, means connecting said switch to the power source, the ratio of the mutual conductance of said *p*-channel MOS-FET to the mutual conductance of said *n*-channel MOS-FET being greater than 10, whereby a voltage applied to said input point which is a fraction of the power source voltage is sufficient to keep said compensation-type MOS-FET turned on for a predetermined period after said switch is closed and while said capacitor discharges into said resistor.

3. A timing circuit comprising a compensation-type MOS-FET having an input and an output, said compensation-type MOS-FET further including a *p*-channel MOS-FET and a *n*-channel MOS-FET, a capacitor, a resistor, a transistor, a switch, means connecting said capacitor between said input point and ground, means connecting said resistor between said input point and a power source, means connecting the gate of said transistor to said switch and to said power source and means connecting the output of said transistor to said input point, means connecting said switch to the power source, the ratio of the mutual conductance of said *p*-channel MOS-FET to the mutual conductance of said *n*-channel MOS-FET being less than 0.1, whereby said compensation-type MOS-FET remains turned off for a predetermined period after said switch is closed until the voltage built up on said capacitor approaches the power source voltage thereby turning on said compensation-type MOS-FET.

* * * * *